July 30, 1963      E. C. HELD, JR      3,099,043
METHOD AND APPARATUS FOR VACUUM FORMING HOLLOW ARTICLES
Filed Oct. 27, 1961      4 Sheets-Sheet 1

INVENTOR.
E.C. HELD, JR.
BY Young and Quigg
ATTORNEYS

July 30, 1963 E. C. HELD, JR 3,099,043
METHOD AND APPARATUS FOR VACUUM FORMING HOLLOW ARTICLES
Filed Oct. 27, 1961 4 Sheets-Sheet 2

INVENTOR.
E.C. HELD, JR.
BY Young and Quigg
ATTORNEYS

July 30, 1963  E. C. HELD, JR  3,099,043
METHOD AND APPARATUS FOR VACUUM FORMING HOLLOW ARTICLES
Filed Oct. 27, 1961  4 Sheets-Sheet 3

INVENTOR.
E.C. HELD, JR.
BY Young and Quigg
ATTORNEYS

July 30, 1963   E. C. HELD, JR   3,099,043
METHOD AND APPARATUS FOR VACUUM FORMING HOLLOW ARTICLES
Filed Oct. 27, 1961   4 Sheets-Sheet 4

INVENTOR.
E.C. HELD, JR.
BY Young and Quigg
ATTORNEYS 3,099,043
Patented July 30, 1963

1

3,099,043
METHOD AND APPARATUS FOR VACUUM
FORMING HOLLOW ARTICLES
Edward C. Held, Jr., Bartlesville, Okla., assignor to
Phillips Petroleum Company, a corporation of Delaware
Filed Oct. 27, 1961, Ser. No. 148,144
8 Claims. (Cl. 18—19)

This invention relates to the formation of hollow articles. In one aspect it relates to a method for the continuous formation of a plurality of hollow articles of thermoplastic material. In another aspect it relates to means for the simultaneous formation of a plurality of hollow thermoplastic articles in a continuous manner.

The production of linear polyethylene in large quantities has greatly increased the number of hollow articles fabricated from thermoplastic materials. These hollow articles include bottles and similar articles having a single, relatively small opening therein. The majority of these articles have been formed by a pressure molding technique similar to that employed in the manufacture of glass bottles.

Recently a technique for vacuum forming thermoplastic sheets has been introduced and has acquired the name of "thermoforming." Thermoforming has proved to be particularly successful in the production of articles such as pans, bowls and other open articles. Although many advantages can be realized by adapting the thermoforming process to the production of hollow articles, attempts to utilize this method have not been entirely successful because of the problem of venting the interior of the hollow article being formed. If even a partial vacuum is formed within the article while in the softened state, deformation of the finished article almost invariably results. This is particularly true when the simultaneous molding of a plurality of hollow objects is attempted.

It is an object of the present invention to provide a method for the simultaneous thermoforming of a plurality of thermoplastic hollow bodies. It is also an object of this invention to provide means to relieve the vacuum within a hollow article formed by the vacuum thermoforming process. A further object of the invention is to provide means to vent the interiors of a plurality of hollow articles formed by the thermoforming process.

Other objects and advantages of the invention will be apparent to one skilled in this art upon study of the disclosure of the invention including the detailed description and the drawing wherein.

According to the invention, a plurality of hollow thermoplastic articles are simultaneously molded by exhausting the air from the mold cavity and providing access of atmospheric air to the interiors of the hollow articles being fabricated. A manifold system is provided which is connected with the openings in the molded article and is also connected to the atmosphere. The method is applicable to batchwise or continuous operation and is herein described with respect to continuous operation. In one modification the manifold is maintained in communication with the atmosphere by mechanical means which is also applicable to introduction of air pressure to the interior of the hollow article if such is desired.

The invention is particularly applicable to the molding of thermoplastic bottles, flasks, drums and the like.

Figure 1:
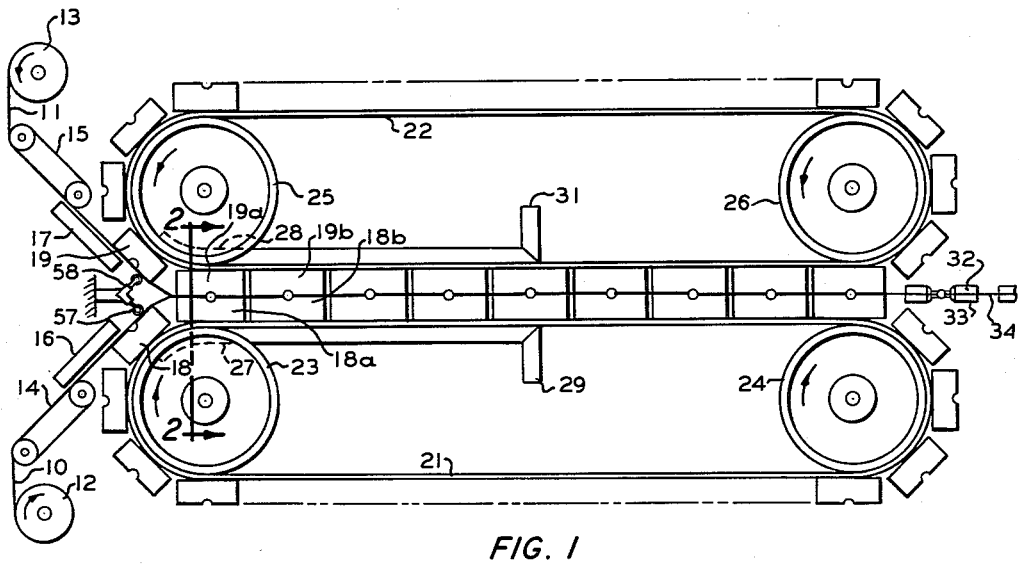
FIGURE 1 is a side elevation of a preferred apparatus for forming hollow bodies according to the invention.

Referring now to FIGURE 1, thermoplastic strips or sheets 10 and 11 pass from rolls 12 and 13 over conveyor belts 14 and 15 and are heated by heaters 16 and 17. The film strips, in softened condition, are then contacted by half-mold 18 and half-mold 19 secured to endless belts 21 and 22 so as to travel continuously over rollers 23—24 and rollers 25—26, respectively. As half-molds 18 and 19 revolve into juxtaposition, as represented by half-molds 18a and 19a, the interiors of the half-molds are subjected to vacuum via channels 27 and 28 and conduits 29 and 31 which are connected to a vacuum source (not shown). The plastic sheets at the edges of the mold halves are subjected to a plastic flow sealing operation as the mold halves are revolved into juxtaposition. The lengths of endless belts 21 and 22 are such that the hollow objects formed (plastic flasks) in the molds 18—19 are cooled sufficiently to be self-supporting by the time the mold halves are separated by the revolution of the endless belts about the rollers so that the molded objects indicated at 32 and 33 are continuously removed attached to web 34 composed of that portion of the film strips which was not confined in the closed mold halves. The molded objects can be removed from the web by conventional means.

Figure 2:
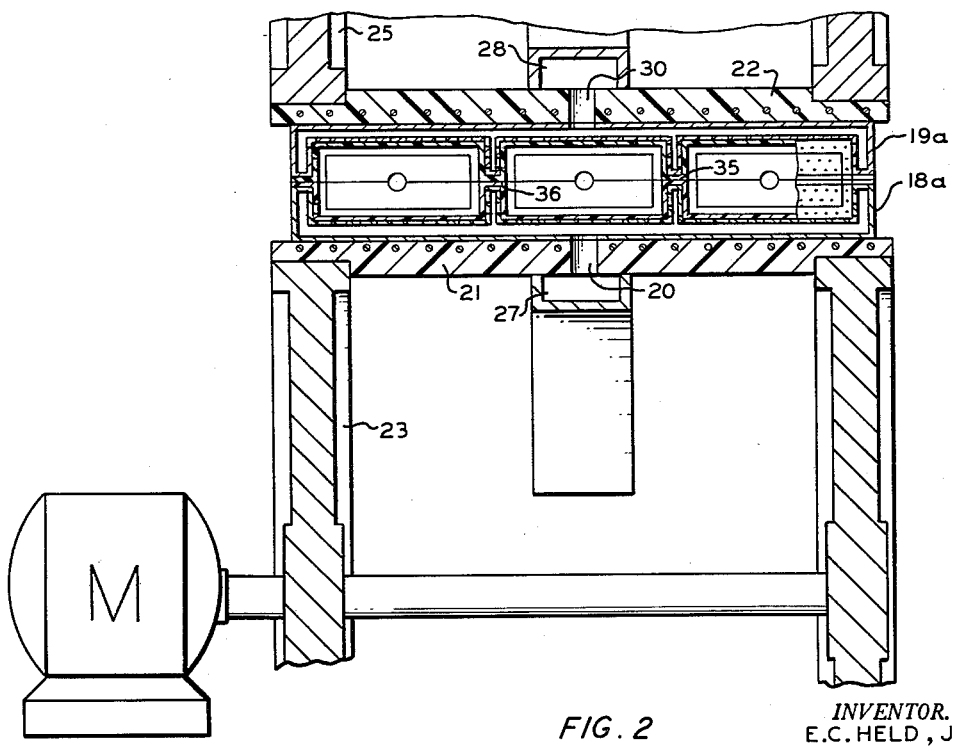
FIGURE 2 is an elevational view, along lines 2—2 of FIGURE 1, showing the interior of a pair of mold halves.

FIGURE 2 illustrates a cross-section of the plastic flasks being produced in the apparatus of FIGURE 1, showing the rollers 23 and 25 and the endless belts 21 and 22. Vacuum is applied to the interiors of the mold halves 18a and 19a via port 20 and channel 27 and via port 30 and channel 28. The plastic web which joined together the molded objects is indicated at 35 and 36. A portion of the plastic flask is removed from the right-hand side of FIGURE 2 so as to show the perforations connecting the interiors of mold cavities of 18a and 19a with the vacuum spaces in the mold shell halves.

Figure 3:
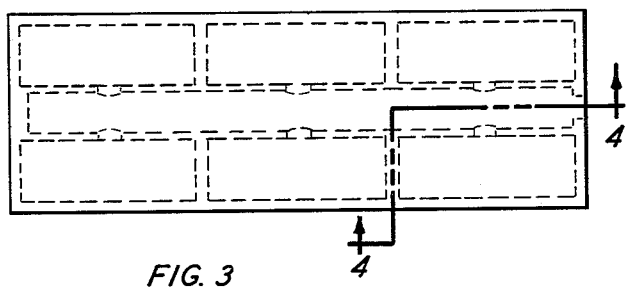
FIGURE 3 is a plan view of a mold as of FIGURE 2.

FIGURE 3 is a plan view of a mold assembly such as indicated by 18a and 19a.

Figure 4:
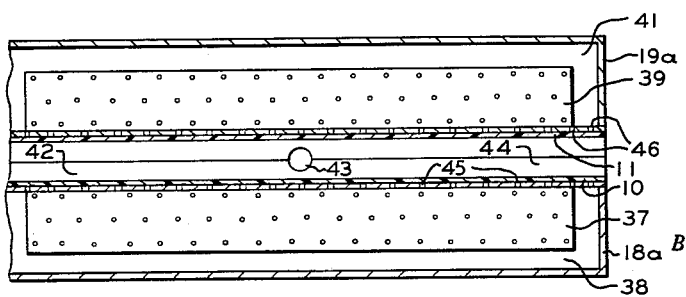
FIGURE 4 is a sectional elevation along lines 4—4 of FIGURE 3.

FIGURE 4 is a section along 4—4 of FIGURE 3 and shows the exterior surface of the mold cavity of 18a indicated at 37 and the vacuum chamber surrounding the perforated mold cavity as indicated at 38. Similarly, the exterior of the perforated mold cavity 39 of mold half 19a is shown surrounded by the vacuum chamber 41. The plurality of flasks which are formed by the mold 18a—19a opens into a manifold 42 as indicated by the opening 43 which represents the open neck of a flask. This manifold is perforated throughout its length so as to provide an access and entrance of air via the opening 44 to the interior of the flasks so as to avoid the formation of a vacuum on the interior of the flasks when the mold halves are closed with the plastic sheets 10 and 11 between the mold halves. The manifold 42 is shown open to the atmosphere only on one side as indicated at 44; however, the manifold can be opened to the atmosphere at each end by the provision of perforations such as indicated at 45 at both ends of the manifold 42. Plastic sheets 10 and 11 are shown to conform to the configuration of the manifold 42 as a result of the vacuum applied via the perforations indicated at 45 and 46.

Figure 5:
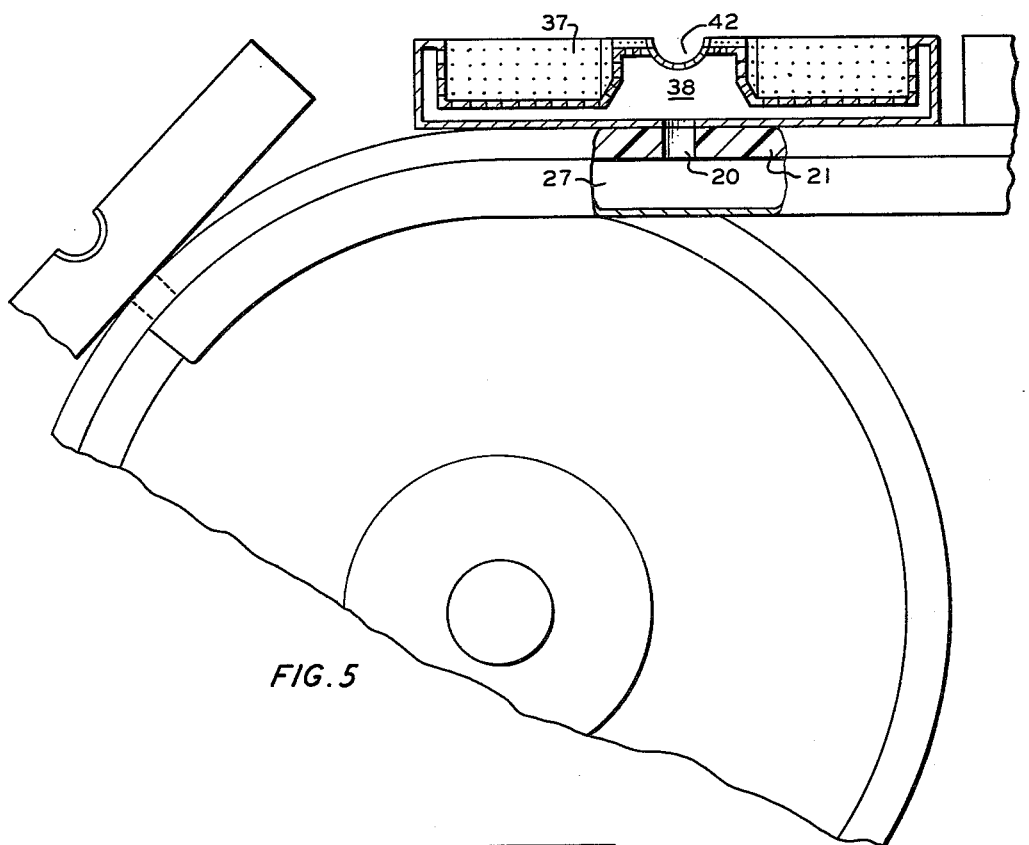
FIGURE 5 is a sectional elevation of a half mold as of FIGURE 2.

FIGURE 5 shows a side cross-sectional view of a mold half in the position of 18a further illustrating the relationship of the mold cavity 37 with the manifold 42. The vacuum jacket 38 is in communication with vacuum channel 27 via opening 20 in endless belt 21.

Figure 6:
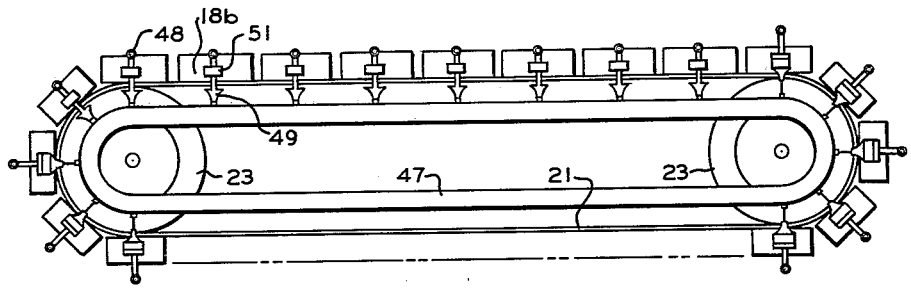
FIGURE 6 is a side elevation of a modification of the apparatus of FIGURE 1.
Figure 11:
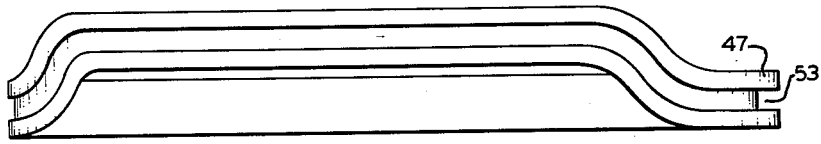
FIGURE 11 is a plan view of the track of FIGURE 8.

A preferred modification of the invention is shown in FIGURE 6 to provide a positive, mechanical means to prevent the softened sheets 10 and 11 from sticking together at the manifold 42 and thus blocking access of atmospheric air to the interiors of the molded hollow objects. The endless belt 21 and rollers 23 are the same as in the apparatus of FIGURE 1. Similarly, the means for providing plastic sheets or films 10 and 11 to the rotating mold halves are the same as in FIGURE 1. The means for applying vacuum to the interior of the mold halves is also the same as in FIGURE 1. These items are not shown so as to simplify an explanation of the elements presently being considered. An endless track 47 is positioned adjacent the endless belt 21 and is shown in greater detail in FIGURES 8–11. A short piece of tubing 48 is supported on a standard 49 which, in turn, is movably positioned in a slot member 51 secured to a mold half such as 18b.

Figure 7:
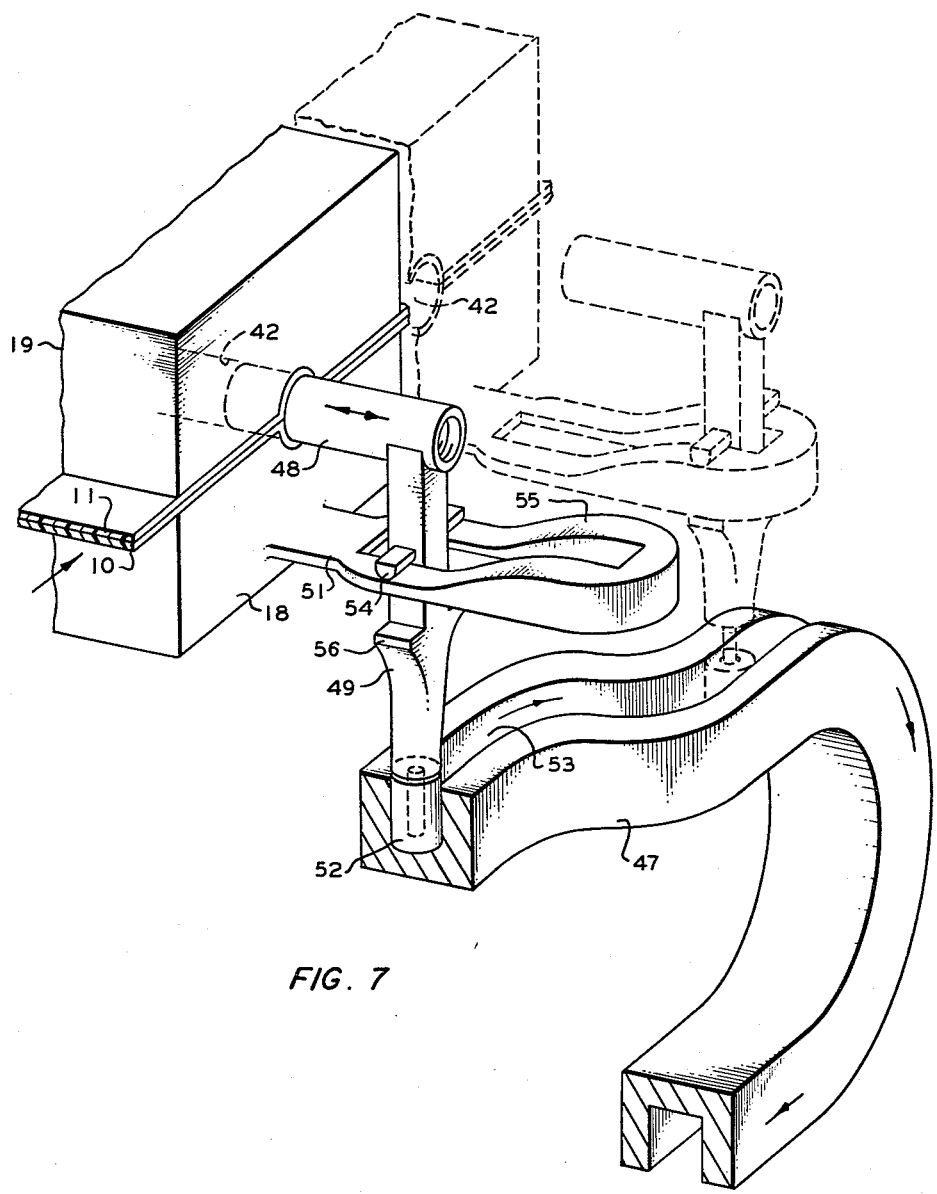
FIGURE 7 is a perspective view of the mechanism at the right side of the apparatus of FIGURE 6.

FIGURE 7 shows in greater detail the operation of the means to maintain the plastic sheets 10 and 11 apart in the manifold 42. Tube 48 is shown separating plastic sheets 10 and 11 in the manifold 42. The standard 49 terminates in a bearing 52 which rides in the groove 53 of endless track 47. As the standard 49 conforms to the configuration of the groove 53 of endless track 47, the standard is moved along the slot member 51 and is caused to rise by the pin 54 sliding along the cam 55 formed in the slot member 51. The tube 48 is thus moved away from the mold 18—19 and simultaneously raised by the combined action of the groove 53 in track 47 and the cam 55 of slot element 51. As the tube 48 and its associated elements rotate about the endless track 47, the ears 56 on standard 49 prevent standard 49 and tube 48 from falling out of the slot element 51.

Figures 8, 10:
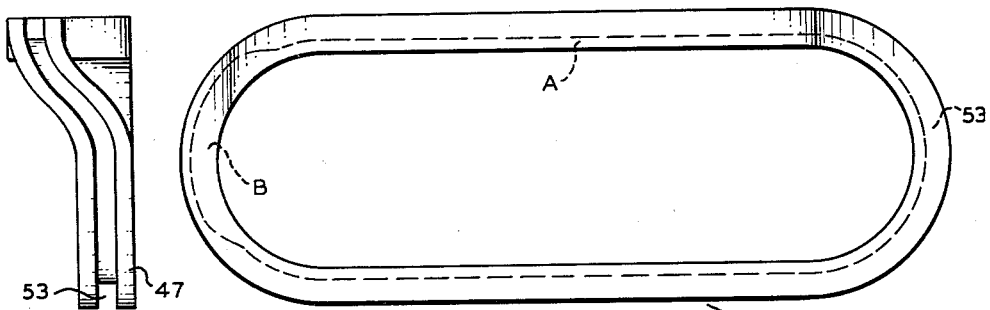
FIGURE 8 is a side elevation of the track shown in FIGURE 7.
FIGURE 10 is an elevation of the left end of the track of FIGURE 8.
Figure 9:
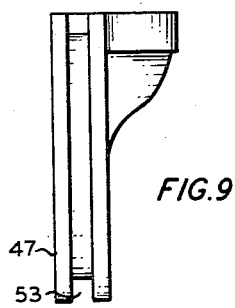
FIGURE 9 is an elevation of the right end of the track of FIGURE 8.

The path followed by the tube 48 and its associated standard 49 can be seen by consideration of FIGURES 8–11. In the area indicated by A the groove 53 in endless track 47 is sufficiently deep so as to allow the standard 49 to rest on the pin 54 in slot element 51. In the area indicated at B the disc of the groove 53 and endless track 47 is such that the standard 49 is maintained with the ears 56 in contact with the slot element 51 regardless of the relationship of the pin 54 to the cam configuration of the slot element 51 so that the tube 48 is held away from the mold halves 18 and 19 during that period of the cycle when the plastic sheets 10 and 11 come into contact with the mold halves 18 and 19 by the configuration of the endless track 47 as illustrated in FIGURES 8 and 10 and considered with respect to FIGURES 1 and 6. After the plastic sheet has been contacted with the mold half 18, the tube 48 is carried toward the mold half 18 by the contour of the endless track 47, as shown in FIGURE 10, and is maintained in elevated position by the disc of the groove 53 as indicated in area B of FIGURE 8. As the mold half 18 is rotated so as to come into juxtaposition with mold half 19, the groove 53 resumes the depth indicated by area A in FIGURE 8 so as to allow the molded halves 18 and 19 to close upon the tube 48 with the tube 48 preventing contact of the plastic sheets 10 and 11 in the manifold section 42.

In the embodiment of the invention shown in FIGURE 1, it may be desirable to provide means to initiate conformation of the plastic sheets 10 and 11 with the depressed portions of mold halves 18 and 19 which coincide to form the manifold 42. Means for accomplishing this is shown in FIGURE 1 as the spring biased rollers 57 and 58 which are positioned to ride upon the plastic sheets 10 and 11 and to urge them into contact with the recessed portions of mold halves 18 and 19 so as to facilitate conformation of the plastic sheets to the interior of the molded cavity.

The apparatus can be constructed so that the endless belts travel horizontally or it can be constructed so that the endless belts travel vertically. Other variations or modifications are possible within the scope of the disclosure of the invention without departing from the spirit and scope of the invention.

That which is claimed is:

1. A process for simultaneously producing a plurality of hollow articles from thermoplastic material which comprises passing two sheets of thermoplastic material into contact with a softening amount of heat, then into contact with two opposing mold die halves each containing a plurality of matching cavities; exhausting air from beneath each sheet to cause the thermoplastic material to conform to the shape of the mold halves; bringing the edges of the mold halves together to form a plurality of hollow articles; maintaining communication between the atmosphere and the interior of the hollow articles; and separating the mold halves to release a plurality of molded articles.

2. The process of claim 1 wherein communication between the atmosphere and the interior of the articles is maintained by exhausting air from beneath a manifold communicating with the atmosphere and the interior of each article in the mold.

3. The process of claim 1 wherein communication between the atmosphere and the interior of the articles is maintained mechanically by inserting a tube between the sheets of thermoplastic at the locus of a manifold communicating with the atmosphere and the interior of each article as the mold is closed upon the sheets of thermoplastic material.

4. Apparatus for producing simultaneously a plurality of hollow thermoplastic articles comprising a plurality of matching mold shell halves each having contained in and spaced from said shell multiple perforated cavities and a manifold means communicating with an opening in each cavity and with the exterior of the mold; a port means in each of said shells for exhausting air therefrom; means for continuously moving and bringing into juxtaposition successive pairs of mold halves; means for continuously supplying a pair of spaced apart, softened thermoplastic sheets to the mold halves so as to cover the mold cavities as the matching halves are brought into juxtaposition; means to exhaust air from the space within the shell of the mold halves; and means to maintain the manifold in communication with the interior of the hollow article and the atmosphere.

5. The apparatus of claim 4 wherein the means for maintaining the manifold in communication with the interior of the hollow article and the atmosphere comprises a plurality of passageways through the wall of the manifold communicating with the space within the shell of the mold halves.

6. The apparatus of claim 4 wherein the means for maintaining the manifold in communication with the interior of the hollow article and the atmosphere comprises a plurality of open ended tubes; and means operatively connected to said tubes and said means for moving said mold halves to insert said tubes into said manifold between said thermoplastic sheets as the mold halves are brought into juxtaposition.

7. The apparatus of claim 4 wherein the means for moving said mold halves into juxtaposition comprises a pair of spaced rollers; means to rotate at least one of said rollers; an endless belt having a plurality of ports therethrough positioned on and moved by said rollers; said mold halves being positioned upon said belt with the port of each mold shell in communication with a port of said belt.

8. Apparatus for producing simultaneously a plurality of hollow thermoplastic articles comprising a first pair of spaced rollers; a first endless belt having a plurality of ports therethrough positioned on, so as to be moved by, said first pair of rollers; a plurality of mold shell halves each having a port therethrough positioned on said first belt with the port in the mold shell in communication with a port in said belt; a second pair of rollers and a second endless belt substantially identical to said first rollers and belt and having associated therewith a plurality of mold shell halves matching those on said first belt, said first and second pairs of rollers being positioned so that as the belts are moved the opposing mold shell halves are brought into juxtaposition; a plurality of perforated mold cavities positioned in each mold shell half and spaced from the shell to provide a passageway for exhausting air from the cavities; a perforated manifold cavity positioned in each shell so as to communicate with an opening to be maintained in the hollow article and with the exterior of the shell; means to rotate at least one of said first pair of rollers and at least one of said second pair of rollers; and open ended tube movably secured to each mold shell half on one of said first and second endless belts; an endless track operatively positioned adjacent the endless belt carrying the mold shell halves having the tubes secured thereto, said endless track having a configuration adapted to insert said tubes between said manifold cavities as the mold halves are brought into juxtaposition; means movably connecting said tubes and said endless track; means for supplying a pair of spaced apart, softened thermoplastic sheets to the mold halves so as to cover the mold cavities as the matching halves are brought into juxtaposition; and means to exhaust the air from beneath the mold cavities as the mold halves are brought into juxtaposition.

References Cited in the file of this patent

UNITED STATES PATENTS

| | | |
|---|---|---|
| 2,790,994 | Cardot et al. | May 7, 1957 |
| 2,918,698 | Hagen et al. | Dec. 29, 1959 |
| 3,013,301 | Lang | Dec. 19, 1961 |

FOREIGN PATENTS

| | | |
|---|---|---|
| 1,170,052 | France | Sept. 15, 1959 |
| 821,173 | Great Britain | Sept. 30, 1959 |